United States Patent [19]
Wang et al.

[11] Patent Number: 5,492,666
[45] Date of Patent: Feb. 20, 1996

[54] CONTROLLED COAGULATION OF RIGID-CHAIN POLYMER THIN FILMS

[75] Inventors: Chyi-Shan Wang, Beavercreek; Jar-Wha Lee, Dublin; D. Mark Husband, Fairborn, all of Ohio

[73] Assignee: The United States of America as represented by the Secretary of the Air Force, Washington, D.C.

[21] Appl. No.: 330,500

[22] Filed: Oct. 20, 1994

[51] Int. Cl.$^6$ ................................................. B29C 39/02
[52] U.S. Cl. ................... 264/204; 264/2.6; 264/331.12; 264/233
[58] Field of Search .................................. 264/204, 203, 264/331.12, 331.11, 2.6, 233

[56] References Cited

U.S. PATENT DOCUMENTS

| | | | |
|---|---|---|---|
| 4,207,407 | 6/1980 | Helminiak et al. | 525/425 |
| 4,377,546 | 3/1983 | Helminiak et al. | 264/331.12 |
| 4,607,095 | 8/1986 | Kuder | 528/337 |
| 5,003,035 | 3/1991 | Tsai et al. | 528/337 |
| 5,028,354 | 7/1991 | Smith et al. | 264/203 |
| 5,064,590 | 11/1991 | Marinaccio | 264/102 |
| 5,233,017 | 8/1993 | Dotrong et al. | 528/332 |
| 5,326,509 | 7/1994 | Chuah et al. | 264/331.12 |

*Primary Examiner*—Jeffery R. Thurlow
*Attorney, Agent, or Firm*—Charles E. Bricker; Thomas L. Kundert

[57] ABSTRACT

A method for preparing optical quality, thin films of rigid-rod polymers and co-polymers, as well as blends of such polymers or co-polymers with flexible coil-like aromatic heterocyclic polymers and co-polymers which comprises (a) preparing a solution of the rigid-rod polymer or co-polymer or blend in a suitable solvent;

(b) forming a film from the solution;

(c) exposing the film to a non-solvent vapor for about 1 to 5 minutes per micron thickness in the finished film; and (d) coagulating the film in a non-solvent.

This method can be employed to prepare films of high nonlinear optical susceptibility for electro-optical device applications. Because of their thermal stability, mechanical strength and chemical resistance, films prepared according to this method can also be used as filters and separation membranes.

14 Claims, 1 Drawing Sheet

CONTROLLED COAGULATION OF RIGID-CHAIN POLYMER THIN FILMS

RIGHTS OF THE GOVERNMENT

The invention described herein may be manufactured and used by or for the Government of the United States for all governmental purposes without the payment of any royalty.

BACKGROUND OF THE INVENTION

The present invention relates to the preparation of optical quality rigid-chain polymer thin films.

In the past several years, nonlinear optics has emerged as a new frontier of scientific research for technological development of photonics by which information may be acquired, stored, processed and transmitted through photons. Organic polymers typically have the desirable mechanical integrity, flexibility, light weight, low linear optical loss, and low temperature solution or melt processibility. Interest in highly conjugated polymers for nonlinear optical applications stems from the potential combination of the typical polymer properties with the unique electronic and optical characteristics of conjugated polymers. Their π-electron delocalization can lead to large optical nonlinearities and their femtosecond response time is by far the fastest compared to inorganic materials and multiple quantum wells.

One group of polymers of particular interest are the para-ordered heterocyclic polymers. This group, commonly referred to as rigid-rod or rigid-chain polymers, has repeating units of the general formula —(—Z—Ar—)—, wherein Z is benzobisazole group and Ar is a para-oriented aromatic moiety, such as 1,4-phenylene, 4,4'-biphenylene, 4,4'-diphenylsulfide, 4,4'-diphenylether or the like. Thus, the group includes poly(p-phenylene benzobisoxazole) (PBO), poly(p-phenylene benzibisthiazole) (PBT) and poly(p-phenylene benzobisimidazole) (PBI) polymers and co-polymers, as well as substituted derivatives thereof.

The preparation and processing of rigid-rod polymers and co-polymers is well known in the art. They are commonly prepared by the condensation of at least one di- or tetra-amino monomer with at least one para-oriented dicarboxylic acid monomer in a strong acid such as polyphosphoric acid (PPA). The polymer or co-polymer is commonly recovered from the reaction mixture by precipitation in water. The polymer or co-polymer can be formed into desirable shapes by directly extruding or spin-casting the PPA mixture into water. Alternatively, the polymer or co-polymer can be precipitated into water, washed, dried and then taken up in a strong acid, such as methanesulfonic acid (MSA), then extruded, cast or spin-cast into water.

Rigid-rod polymers and co-polymers generally have very high thermal stability, high mechanical strength and low solubility in ordinary solvents. These polymers and co-polymers generally have melting temperatures higher than their thermal degradation temperatures; thus, they cannot be processed by melt-processing techniques. As noted previously, they are normally processed into desirable shapes by extrusion, casting or spin-casting from a strong acid solution, such as from a methanesulfonic acid solution. Optical quality thin films of PBT have been fabricated by coagulation from solutions in MSA or PPA and by spin-casting from organic solvents with Lewis acids. Over the years, the third-order nonlinear optical susceptibility, $\chi^{(3)}$, of PBT thin films showed significant increase from $6\times10^{-12}$ to $4.5\times10^{-10}$ esu. In the conventional extrusion and coagulation process used for making rigid-rod films, the films normally show four types of defects: (a) large voids of about 20 µm size, (b) small particles of about 1 µm size, (c) lines parallel to the direction of extrusion and (d) lines transverse to the direction of extrusion. These defects are believed to significantly contribute to the optical loss of the rigid-rod films.

Helminiak et al, U.S. Pat. No. 4,377,546, issued Mar. 22, 1983, disclose a method for preparing a molecular composite film comprising the steps of forming a solvent mixture of methanesulfonic acid and a polymer mixture of rod-like, aromatic heterocyclic polymer and an amorphous, coil-like, aromatic heterocyclic polymer, casting the solvent mixture and exposing the resulting polymer layer to water vapor for a period of time sufficient to form a precipitated film. When used with a solvent mixture of methanesulfonic acid and a rod-like, aromatic heterocyclic polymer, this method provides films free of large voids. However, the resulting films had very poor optical transparency.

Accordingly, it is an object of this invention to provide a method for preparing optical quality, thin films of rigid-rod polymers and co-polymers.

Other objects and advantages of the present invention will be apparent to those skilled in the art.

DESCRIPTION OF THE INVENTION

Figure 1:
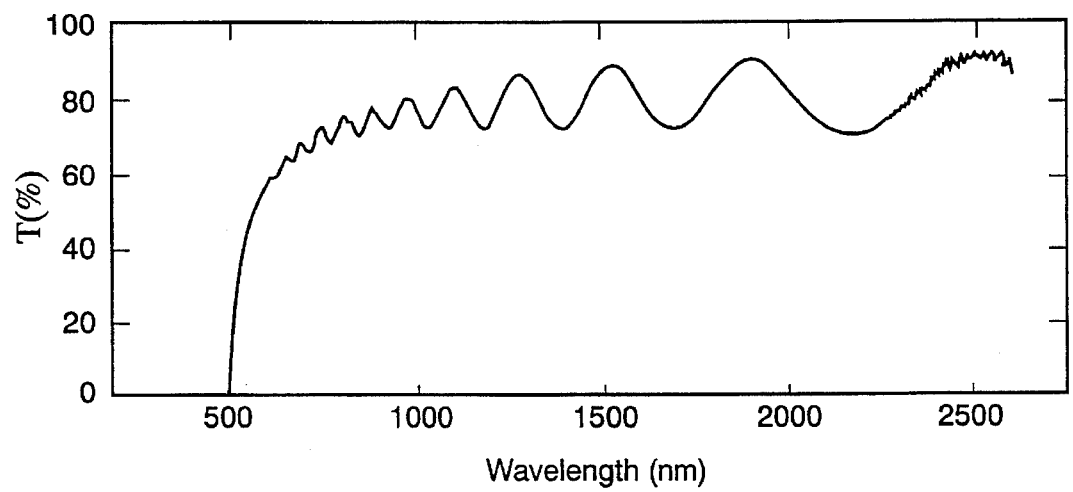
FIG. 1 is the optical transmission spectrum of a thin film prepared in accordance with the invention.

In accordance with the present invention there is provided a method for preparing optical quality, thin films of rigid-rod polymers and co-polymers, as well as blends of such polymers or co-polymers with flexible aromatic heterocyclic polymers and co-polymers which comprises (a) preparing a solution of the rigid-rod polymer or co-polymer, or the blend, in a suitable solvent;

(b) forming a film from the solution;

(c) exposing the film to a non-solvent vapor for about 1 to 5 minutes per micron thickness in the finished film; and (d) coagulating the film in a non-solvent.

The terms "solvent" and "non-solvent", as used here and in the claims, have reference to the rigid-rod polymers and co-polymers. Thus, MSA and PPA are solvents for these polymers/co-polymers, while water is a non-solvent. Other suitable solvents include concentrated sulfuric acid, m-cresol, and the like. Other suitable non-solvents include the lower alkyl alcohols, such as methanol, ethanol, propanol and the like, and lower alkyl ketones, such as acetone, methyl ethyl ketone and the like.

The rod-like, aromatic heterocyclic polymers and co-polymers used in the practice of the present invention exhibit para-ordered geometry. Examples of such polymers and co-polymers, which are widely described in the literature, are disclosed in Helminiak et at, U.S. Pat. No. 4,377,546 and Tsai et at, U.S. Pat. No. 5,003,035. Generally, these polymers and co-polymers have a number of repeating or recurring units such that the polymers/co-polymers have an intrinsic viscosity of at least 2 dl/g, preferably 5 to 30 dl/g, inclusive, as determined in methanesulfonic acid at 30° C. Flexible, coil-like heterocyclic polymers are disclosed in Helminiak et al, U.S. Pat. No. 4,207,407. Generally, the weight ratio of rigid-rod polymer or co-polymer to flexible polymer or co-polymer in blends is about 5:95 to 60:40.

Initially, a solution of the rod-like, aromatic heterocyclic polymer/co-polymer in the acid solvent is prepared. Although the solution concentration can range from, for example, 0.1 percent to greater than 5 percent, by weight, we have found that a concentration of 3 percent is so viscous as to be almost impossible to form into film by the doctor-blade method. Accordingly, we prefer to employ solution concentrations of about 0.5 to 2.5 percent, more preferably 1.0 percent.

The acid solution is formed into a thin film having a thickness of about 50 to 1000 μm by extrusion or by doctor-blading onto a suitable substrate or surface, such as glass. As a rough guide, the finished film will generally have a thickness about equal to the solution thickness times the solution concentration. Thus, a 1 percent solution extruded or laid down to a thickness of about 100 microns will provide a finished film about 1 micron thick. The thus-formed film is exposed to a non-solvent vapor for about 1 to 5, preferably about 1.5 to 3 minutes per micron thickness in the finished film. Since we employ a solution concentration which is generally sufficiently low so as to provide a clear solution, the desired exposure time can be determined by the onset of cloudiness in the exposed surface of the film. Following such exposure to the vapor, the film is immediately coagulated, i.e., quenched, with the non-solvent. The resulting film is removed from the substrate and rinsed to remove residual solvent. The film can be washed, then dried.

The method of the present invention can be employed to prepare films of high nonlinear optical susceptibility for electro-optical device applications. Because of their thermal stability, mechanical strength and chemical resistance, films prepared according to the present invention can also be used as filters and separation membranes.

The following example illustrates the invention:

EXAMPLE

A one percent stock solution of poly(p-phenylene benzobisthiazole) in methanesulfonic acid was prepared by stirring at room temperature under a nitrogen atmosphere. The PBT had an intrinsic viscosity of 16 dl/g in MSA at 30° C., corresponding to a weight average molecular weight of about 27000 g/mol. The solution became homogeneous in a few days and was optically isotropic. The solution was then filtered through a sintered glass filter of 25–50 micron pore size.

Thin films of the PBT solution were formed by doctor-blading the solution onto glass microscope slides. Film thickness was controlled using spaced-apart thickness guides made of layers of transparent tape, each tape layer having a thickness of about 60 microns. A microscope slide was employed as the "doctor blade".

A first group (I) of the PBT thin films was coagulated immediately after forming. A second group (II) of the films was exposed to water vapor for 1 to 7 minutes, then contacted with water until coagulation was complete. A third group (III) of the films was exposed to water vapor until the polymer was completely coagulated.

A high resolution scanning electron microscope (SEM) was used to examine the surface and internal structures of the PBT films. A layer of tungsten 30 Å thick was sputtered on the SEM specimens. Micrographs were taken at 2 KV from two areas of the films: (a) the doctor-bladed surface and (b) the cross-sectional area.

The optical quality of the Groups I and II films is listed in Table I, below:

TABLE I

| Film Thickness (microns) | Time (min.) | | | | |
| --- | --- | --- | --- | --- | --- |
| | 0 | 1 | 3 | 5 | 7 |
| 0.62 | V | G | G | PS | PS |
| 1.06 | V | V | G | PPS | PS |
| 2.12 | V | V | G | G | G |
| 2.75 | V | V | V | G | G |
| 4.66 | V | V | V | G | G |
| 5.86 | V | V | V | G | G |

Key: G - Good Optical Quality
V - Voids
PS - Phase Separated
PPS - Partially Phase Separated The immediately coagulated films (Group I, exposure time of 0 in Table I, above) exhibited large voids. The size of these voids was dependent on the thickness of the film: the thicker the film, the larger the voids. For example, a 240 μm film (wet, doctor-bladed thickness) exhibited voids about 100 μm and small particles a few microns in size. These films showed crinkles on an otherwise smooth surface. The smooth surface is believed to have resulted from a rapid coagulation of the PBT solution in water causing the molecular dispersion of PBT to be swiftly halted in the films. These films had a fine network internal structure.

The Group II films, partially coagulated over water vapor, then contacted with water, exhibited a surface structure composed of fibrous networks having a pore size about 200 to 300 nm, smaller than the wavelength of visible light, rendering a low optical loss in the film. These films also had a fine network internal structure.

The Group III films, coagulated completely over water vapor, exhibited a surface structure of large interconnected domains. The domain structure was composed of fibrous networks, indicating that the domains resulted from phase separation of the network structure during the prolonged, slow coagulation of PBT in the moist environment. The internal structure of the Group III films was a much coarser network, with fibrils significantly larger than those in the Groups I and II films, indicating a greater degree of phase separation of PBT. The low optical transparency of the Group III films was likely due to the large domains and the spaces that strongly scatter light.

The transmission UV/Vis/NIR spectrum of a PBT thin film is shown in FIG. 1. The film was coagulated from a doctor-bladed, 1% solution about 180 microns thick and subjected to surface treatment in the humid environment for five minutes. The optical spectrum shows the constructive and destructive interference fringes. The film thickness is related to the interference fringes by the equation $$2nd = m\lambda_m \quad (1)$$

where n is the index of refraction, d is the film thickness, m is the interference order, and $\lambda_m$ is the wavelength at which the transmission extreme is observed. Based on Equation (1), the film thickness can be calculated from the wavelengths of two consecutive transmission extremes, $\lambda_m$ and $\lambda_{m+1}$ using the equation $$d = \frac{\lambda_m \lambda_{m+1}}{2n(\lambda_m - \lambda_{m+1})} \quad (2)$$

if the refractive indices at the two wavelengths are equal.

The thin films showed decrease of refractive index with increasing wavelength to an asymptotic value of about 1000 nm. This value was 1.96 and 1.80, respectively, at the two principal directions with respect to the extrusion (doctor-blade) direction. For an isotropic PBT film, a refractive index of 1.88 is a reasonable estimation. It is essentially identical to the arithmetic and the geometric average of 1.96 and 1.80 and it is very close to the average (1.87) calculated from the index of ellipsoid with refractive indices of 1.96 and 1.80. The thickness of the film was estimated to be 2.1 microns, from Equation (2).

As a first approximation, the percent transmission (T%) of the films in relation to the wavelength is assumed to be the medium between the two curves constructed respectively from the constructive and the destructive extremes of the interference fringes in the optical spectrum. The T% is related to the relative intensity $I_t/I_o$ of the transmitted light to the incident beam by T%=100 $I_t/I_o$. The $I_t/I_o$ thus obtained for the PBT film is shown in logarithmic scale in FIG. 2 as a function of the wavelength of the light and the film thickness. It reveals that the $I_t/I_o$ is sensitive to the film thickness only at the wavelengths shorter than 1000 nm. At longer wavelengths, the insensitivity of $I_t/I_o$ to film thickness indicated that the optical loss at these wavelengths is mainly due to a surface reflection rather than an internal absorption or scattering.

Surface reflection occurs when an electromagnetic wave crosses an interface between two media of different refractive indices. For a beam traveling normally to the interface of a freestanding film in air, the fraction reflected is governed by the equation $$\frac{I_r}{I_o} = \frac{(n_2 - n_1)^2}{(n_2 + n_1)^2} \quad (3)$$

where $I_r$ is the intensity of reflected light, and $n_1$ and $n_2$ are the refractive indices of air and the film, respectively. The optical attenuation doe to the absorption of a material is described by the Beer's law $$\frac{I_t}{I_o} = e^{-\alpha d} \quad (4)$$

where $I_t$ is the intensity of the transmitted beam, $\alpha$ is the optical attenuation coefficient, and d is the thickness of that material. By assuming that the doctor-bladed and coagulated PBT films are structurally uniform, then the intensity attenuation of a beam propagating normally through such a film can be analyzed based on Equations (3) and (4). The intensity of the transmitted beam is, therefore, related to the intensity of the incident beam by the equation $$\frac{I_t}{I_o} = \left[ 1 - \frac{(n_2 - n_1)^2}{(n_2 + n_1)^2} \right]^2 e^{-\alpha d} \quad (5)$$

It is clear from Equation (5) that there exists a linear relationship between $\ln(I_t/I_o)$ and d, so the optical attenuation coefficient $\alpha$ can be determined from the slope of the semi-logarithmic plot of $\ln(I_t/I_o)$ versus d. When the d in Equation (5) is replaced with zero (0), the equation reduces to the description of the relative intensity of the transmitted beam which has the intensity of incident beam less than the optical loss due to the surface reflection at the two interfaces of the free-standing film. Therefore, the optical loss due to the surface reflection of the film can be determined from the intercept of the semi-logarithmic plot at zero film thickness.

Figure 2:
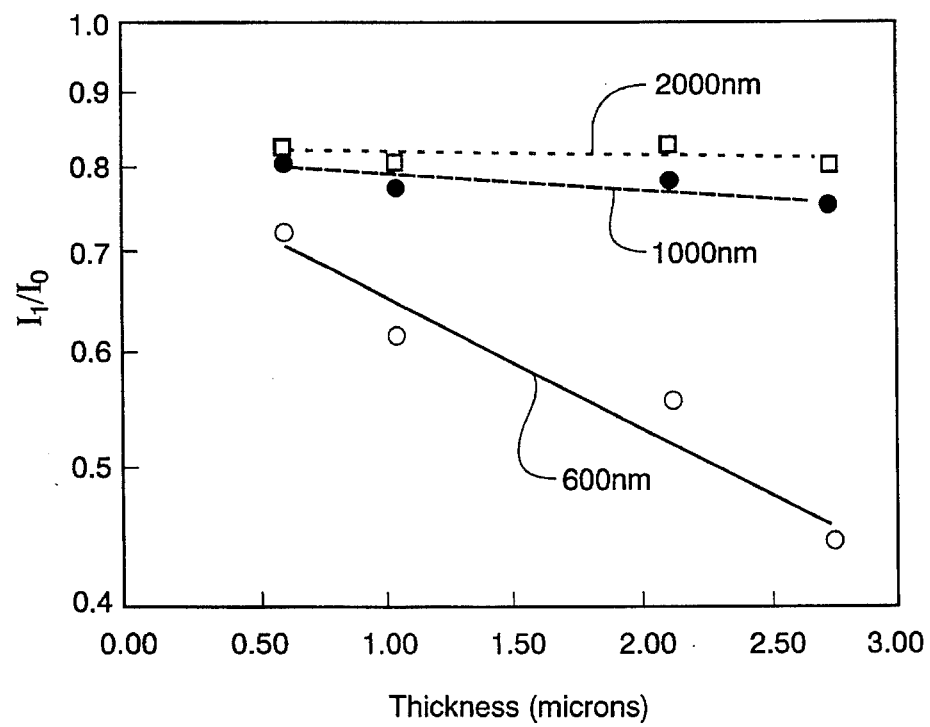
FIG. 2 is a plot of relative intensity versus film thickness and wavelength.

By extrapolating the $I_t/I_o$ in FIG. 2 to zero film thickness, the optical loss of the PBT film due to surface reflection is found to be 20% at 600 nm wavelength and 18% at longer wavelengths. This optical loss calculated from Equation (5) is 25% at 600 nm ($n_2$=2.1) and 18% at longer wavelengths ($n_2$=1.88), in good agreement with that extrapolated from the $I_t/I_o$ in FIG. 2. The optical attenuation coefficient of the PBT thin films estimated from the slope of $\ln(I_t/I_o)$ versus d is about 2000 cm$^{-1}$ at 600 nm and 350 cm$^{-1}$ at 1000 nm. The optical attenuation of 350 cm$^{-1}$ corresponds to an optical loss of 1500 dB/cm.

Various modifications may be made in the instant invention without departing from the spirit and scope of the appended claims.

We claim:

1. A method for preparing thin films of rigid-rod, aromatic heterocyclic benzobisazole polymers and co-polymers which comprises
   (a) preparing a 0.1 to 5.0 weight percent solution of the rigid-rod polymer or co-polymer in a suitable solvent;
   (b) forming a film from the solution;
   (c) exposing the film to a non-solvent vapor for about 1 to 5 minutes per micron thickness in the finished film;
   (d) quenching the film in a non-solvent; and
   (e) recovering the finished film.

2. The method of claim 1 wherein said polymer is a benzobisoxazole polymer.

3. The method of claim 1 wherein said polymer is a benzobisthiazole polymer.

4. The method of claim 1 wherein said polymer is a benzobisimidazole polymer.

5. The method of claim 1 wherein said polymer is a poly(p-phenylene benzobisazole).

6. The method of claim 1 wherein said polymer is a poly(4,4'-biphenylene benzobisazole).

7. The method of claim 1 wherein said solvent is methanesulfonic acid.

8. The method of claim 1 wherein said solvent is polyphosphoric acid.

9. The method of claim 1 wherein said solvent is concentrated sulfuric acid.

10. The method of claim 1 wherein said non-solvent is water.

11. The method of claim 1 wherein the film formed in step (b) has a thickness of about 50 to 500 microns.

12. The method of claim 1 wherein the film formed in step (b) is exposed to said non-solvent vapor in step (c) for about 1.5 to 3 minutes per micron thickness in the finished film.

13. The method of claim 1 wherein said polymer is a benzobisazole co-polymer.

14. A method for preparing thin films of a blend of rigid-rod, aromatic heterocyclic benzobisazole polymers and co-polymers and flexible, coil-like aromatic heterocyclic benzobisazole polymers and co-polymers, which comprises
   (a) preparing a 0.1 to 5.0 weight percent solution of the blend in a suitable solvent;
   (b) forming a film from the solution;
   (c) exposing the film to a non-solvent vapor for about 1 to 5 minutes per micron thickness in the finished film;
   (d) quenching the film in a non-solvent; and
   (e) recovering the finished film,
wherein the weight ratio of rigid-rod polymer or co-polymer to flexible polymer or co-polymer is about 5:95 to 60:40.

* * * * *